INVENTORS.
ERNEST N. DULANEY
WILLIAM S. ELLIOTT
CHARLES F. HABERLY
ROBERT H. POOL

BY *Larry Harold Kline*
ATTORNEY

INVENTORS.
ERNEST N. DULANEY
WILLIAM S. ELLIOTT
CHARLES F. HABERLY
ROBERT H. POOL

BY Larry Harold Kline
ATTORNEY

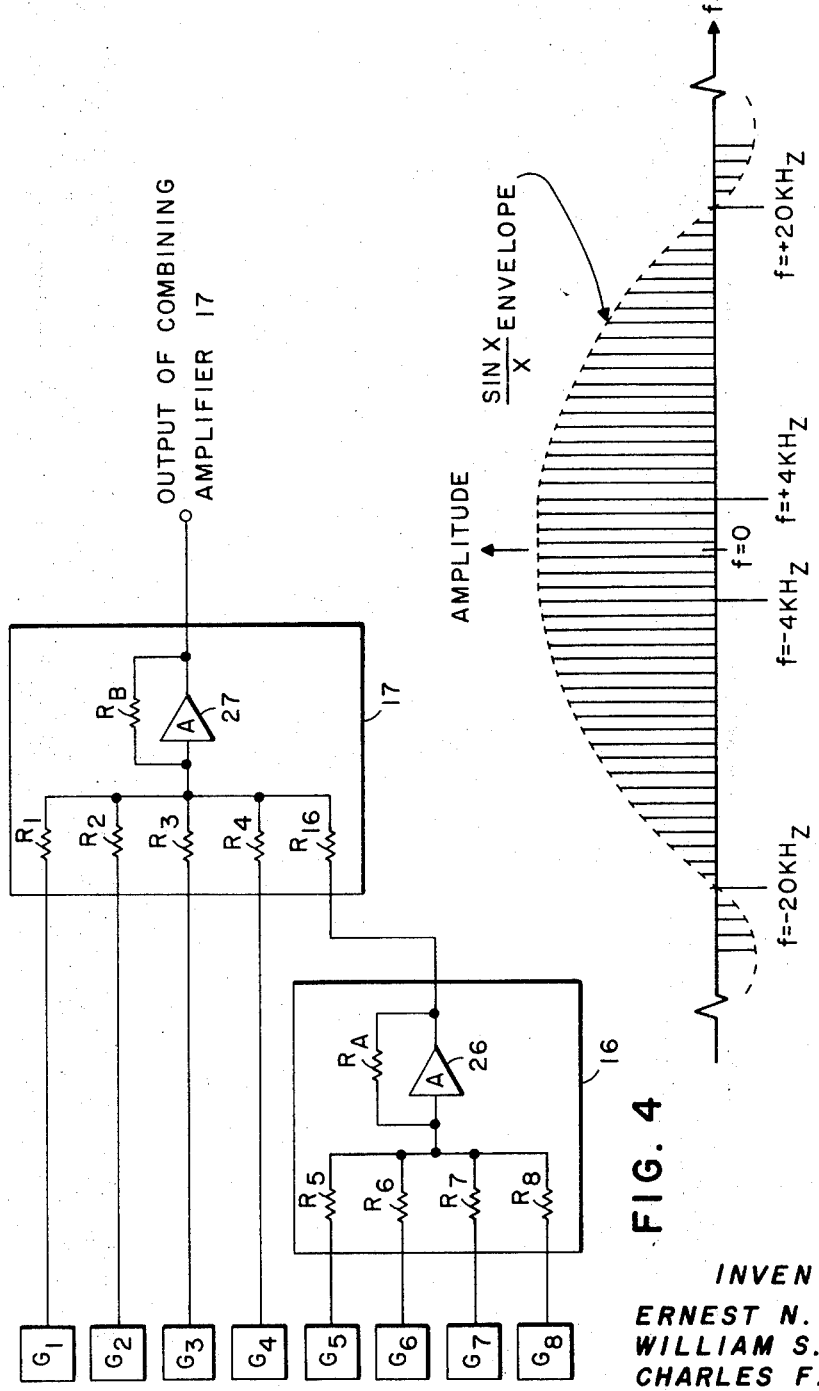

United States Patent Office 3,544,906
Patented Dec. 1, 1970

3,544,906
LOGIC PULSE TIME WAVEFORM SYNTHESIZER
Ernest N. Dulaney, Marion, William S. Elliott and Charles
F. Haberly, Cedar Rapids, and Robert H. Pool, Marion,
Iowa, assignors to Collins Radio Company, Dallas,
Tex., a corporation of Iowa
Filed Dec. 20, 1968, Ser. No. 785,592
Int. Cl. H03b 19/00
U.S. Cl. 328—14                     20 Claims

ABSTRACT OF THE DISCLOSURE

A logic pulse time waveform synthesizer is disclosed wherein logic pulses in a pulse train are digitally separated, amplitude-weighted and then recombined to form a predetermined pulse time waveform with which a predetermined frequency spectrum is associated.

This invention relates to time waveform synthesizers and, more particularly to logic means for producing a predetermined pulse time waveform from a pulse train.

With every time waveform there is associated a unique amplitude frequency spectrum which can be determined by use of Fourier analysis. Many different frequency spectrums may be used for various applications, i.e., transmitting systems, measuring systems, navigation systems, communication systems, etc.

One spectrum which may be used in these various applications and is discussed herein is the double-sideband, suppressed carrier spectrum. Methods for the generation of double-sideband, suppressed carrier spectrum are well known. Most of these methods, however, involve the use of some form of balanced modulator. The balanced modulator in these known methods frequently causes linearity problems. To maintain the proper frequency pureness of the desired signals, it is necessary to use a very pure modulation signal which may be difficult to obtain. In this invention, these problems are eliminated by a method and circuit for synthesizing a time waveform using a pulse train, logic level devices, and combining amplifiers. Each pulse of the synthesized time waveform can be individually adjusted to obtain a properly designed envelope and, therefore, proper control can be maintained over the designed waveform.

An object of the present invention is to produce a predetermined frequency spectrum by the synthesis of a time waveform using logic level devices.

Another object of this invention is to produce a double-sideband, suppressed carrier frequency spectrum by the synthesis of a time waveform using logic level devices.

Still another object of this invention is to provide a method of producing a predetermined pulse time waveform by digitally separating logic pulses in a pulse train, amplitude weighting the separated pulses, and recombining the pulses to form the predetermined pulse time waveform.

Another object of this invention is to provide a logic means for producing a double-sideband, suppressed carrier frequency spectrum.

These and other objects and features of the invention will be apparent from the following description and appended claims.

Briefly, the present circuit for producing a predetermined pulse time waveform includes pulse train producing means and counting means connected to the output of the pulse train producing means to count the pulses of the pulse train. The circuit has a plurality of logic device means each of which is connected to predetermined outputs of the counting means and to the output of the pulse train producing means. Each of the logic device means passes an output pulse in response to a predetermined count of the counting means. The invention has amplitude weighting and combining means connected to the outputs of the plurality of logic device means which amplitude-weight the pulses from the output of the plurality of logic device means and combine the amplitude-weighted pulses into a continuous pulse train producing the predetermined pulse time waveform.

The invention will be more fully understood from the following detailed description and appended claims when taken with the drawings in which:

FIG. 4 illustrates schematically the operational amplifiers and plurality of resistors of combining amplifiers 16 and 17.

FIG. 6 illustrates the frequency spectrum of the output of combining amplifier 17.

Figure 1:
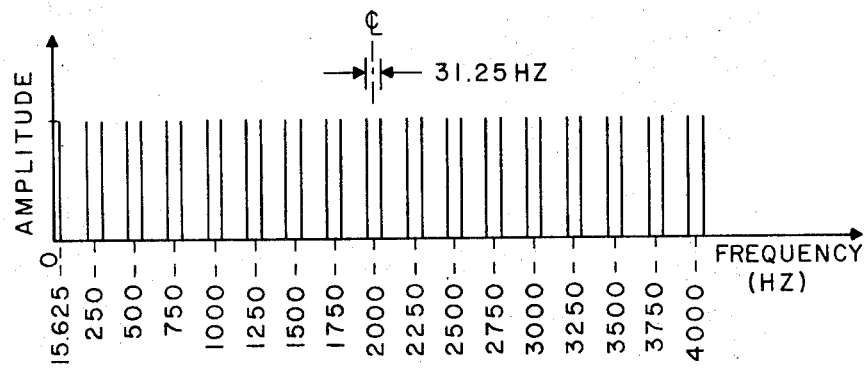
FIG. 1 is an illustration of a portion of a double-sideband, suppressed carrier spectrum from 0 to 4, 0.15.625 hertz.

Referring now to the drawings, FIG. 1 shows a double-sideband, suppressed carrier frequency spectrum. It should be noted that while the frequency spectrum of FIG. 1 is referred to as a double-sideband, suppressed carrier frequency spectrum, it is actually a multiple double-sideband, suppressed carrier frequency spectrum which can be filtered to obtain any portion of the frequency spectrum thereof. For illustrative purposes, the double sidebands in each group are 31.25 hertz apart and are centered about frequencies which are multiples of 250 hertz. These values are, of course, just for illustrative purposes and the circuit herein described could be designed to operate at an infinite number of combinations of sideband separation and suppressed carrier locations.

Figure 2:
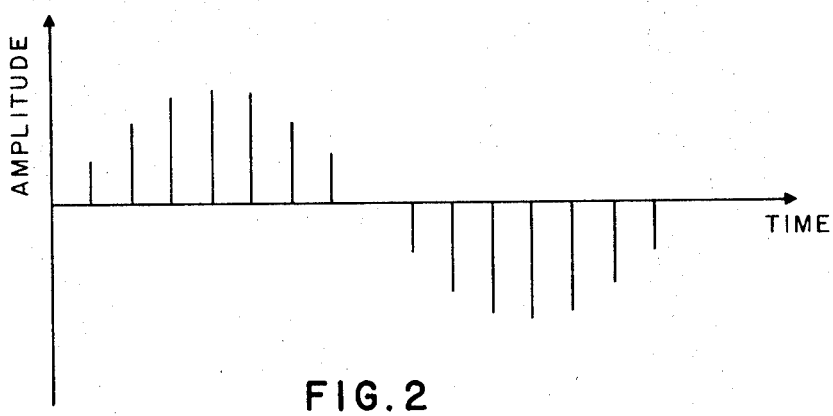
FIG. 2 is the time waveform consisting of a pulse train with a sinusoidal envelope with which is associated a multiple double-sideband, suppressed carrier frequency spectrum.

It is a commonly known fact that there is associated with every time waveform a unique amplitude frequency spectrum. In the design of a circuit to produce a predetermined frequency spectrum, the time waveform that would produce the spectrum would have to be determined. This may be done by Fourier analysis and the principles involved may be found in many textbooks including "Statistical Theory of Communication" by Y. W. Lee which was copyrighted in 1960 by John Wiley and Sons, Inc. It may be noted, that to obtain the desired frequency spectrum, it is only necessary to obtain a time waveform that is associated with this frequency spectrum. FIG. 2 illustrates the time waveform, consisting of pulses, which must be developed for the double-sideband, suppressed carrier frequency spectrum of FIG. 1. Other time waveforms not consisting solely of pulses could produce the same amplitude frequency spectrum if phase relationships are changed.

Figure 3:
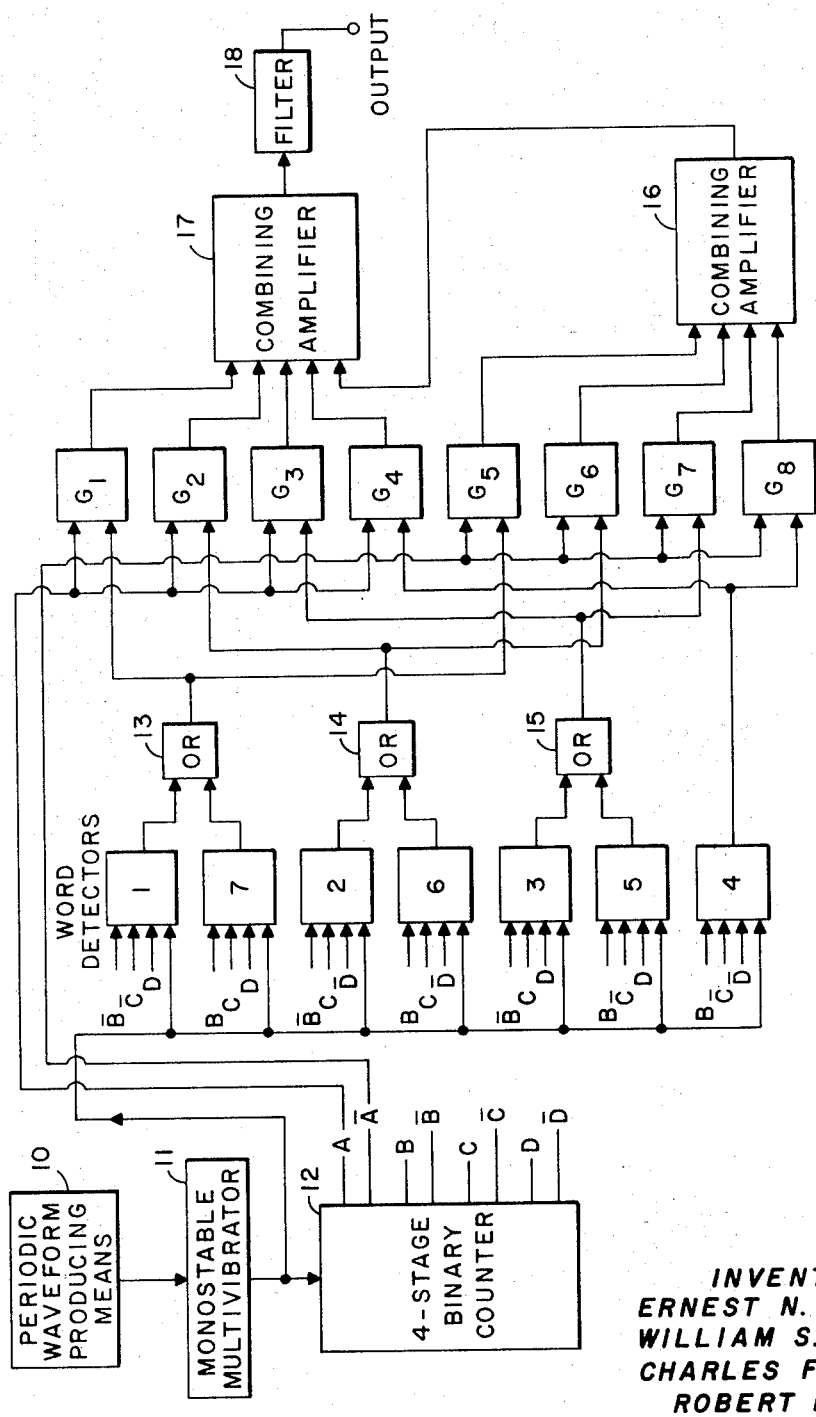
FIG. 3 is a schematic block diagram of a logic circuit that will produce a time waveform with which is associated a multiple double-sideband, suppressed carrier frequency spectrum.

FIG. 3 illustrates the schematic block diagram of the logic circuit used to produce the multiple double-sideband, suppressed carrier frequency spectrum of FIG. 1. The pulse train from which the time waveform is derived is produced by any conventional pulse train producing means which may comprise, for example, waveform producing means 10 and multivibrator means 11. As shown, a monostable multivibrator is used as the multivibrator means 11 in this specific form of the invention. The monostable multivibrator 11 develops a pulse train which has a pulse width which can be predetermined by values of components within the monostable multivibrator 11 and a pulse repetition rate which is equal to the frequency of the periodic waveform produced by periodic waveform producing means 10. Other types of multivibrator means, for example a bistable type of multivibrator, could be used in which the pulse repetition frequency would not be equal to the frequency of the periodic waveform produced by periodic waveform producing means 10. The pulse train output of multivibrator means 11 is directed to the input of a counting means, which in this example is a four-stage binary counter 12. The four-stage binary counter 12 has eight outputs, the true and complement outputs D and $\overline{D}$ representing in binary form the number $2^0$ C and $\overline{C}$ representing in binary form the number $2^1$, B and $\overline{B}$ representing in binary form the number $2^2$, and A and $\overline{A}$ representing in binary form the number $2^3$. The true and complement outputs of each of the first three stages D and $\overline{D}$, C and $\overline{C}$, and B and $\overline{B}$ of the binary counter and the pulse train from monostable multivibrator 11 are directed in a predetermined manner to seven logic device means which are 4-input word detectors numbered 1, 2, 3, 4, 5, 6, and 7. The 4-input word detectors are actually 4-input "AND" gates. Each of these word detectors produces an output pulse in response to a predetermined count of the four-stage binary counter 12. The designation numbers of the word detectors also indicate upon which specific count of the four-stage binary counter 12 an output pulse will be passed.

Any number of these logic device means or word detectors may be used depending on the weighting shape of the desired pulse waveform. In this example, since the desired pulse spectrum is to be sinusoidally weighted, only seven word detectors are necessary. With other desired weighted waveforms, more or fewer word detectors could be used. The counting means could also be designed to count more or fewer pulses, again depending on the desired design for the output time waveform and its associated frequency spectrum. Each of the logic device means, in any case, would pass an output pulse in response to a predetermined count of the counting means.

Using only the first three stages of the binary counter 12 as inputs to the seven 4-input "AND" gates, an output pulse will be passed at each word detector for two counts of the binary counter 12, which counts pulses from 0 to 15. By adding the number 8 to each original number labeled on the word detectors, the second count at which an output pulse will be produced may be determined. For example, word detector 1 will produce an output pulse when the four-stage binary counter 12 counts pulses 1 and 9. Word detector 2 will pass a pulse at pulse count 2 and 10. Word detector 3 will pass a pulse at pulse count 3 and 11. Word detector 4 will pass a pulse at pulse count 4 and 12. Word detector 5 will pass a pulse at pulse count 5 and 13. Word detector 6 will pass a pulse at pulse count 6 and 14. Word detector 7 will pass a pulse at pulse count 7 and 15.

The outputs of the plurality of logic device means, i.e., word detectors, is connected to amplitude weighting and combining means which amplitude weight the pulses from the outputs of the word detectors and combine the amplitude-weighted pulses into a continuous pulse train thereby producing the predetermined pulse time waveform.

The amplitude weighting and combining means includes a plurality of "OR" gates 13, 14, and 15 each connected to predetermined outputs of the plurality of logic device means, which are the word detectors labeled 1, 2, 3, 4, 5, 6, and 7; a plurality of "AND" gates $G_1$, $G_2$, $G_3$, $G_4$, $G_5$, $G_6$, $G_7$, and $G_8$ each connected to the output of one of the plurality of "OR" gates 13, 14, and 15 and to one of the plurality of digital outputs from the counting means 12; and a combining and weighting amplifier means including combining amplifiers 16 and 17 selectively connected to the outputs of "AND" gates $G_1$, $G_2$, $G_3$, $G_4$, $G_5$, $G_6$, $G_7$, and $G_8$ for amplitude weighting and combining the outputs into a pulse time waveform.

The outputs of word detectors 1 and 7 are inputs to "OR" gate 13. The outputs of word detectors 2 and 6 are inputs to "OR" gate 14. The outputs of word detectors 3 and 5 are inputs to "OR" gate 15. The "OR" gates 13, 14, and 15 will each pass a pulse if an input pulse is present on either of the two inputs to each "OR" gate. The output of "OR" gate 13 is connected to "AND" gates $G_1$ and $G_5$. The output of "OR" gate 14 is connected to "AND" gates $G_2$ and $G_6$. The output of "OR" gate 15 is connected to "AND" gates $G_3$ and $G_7$. The output of word detector 4 is connected to "AND" gates $G_4$ and $G_8$.

The fourth stage of binary counter 12 has two outputs A and $\overline{A}$. The presence of a signal on A or $\overline{A}$ indicates whether or not a higher order digital number, in this case at least a number of $2^3$, i.e., 8, is being counted. A and $\overline{A}$ are considered as being higher order digital inputs. One output of the fourth stage of binary counter 12, A, is connected to "AND" gates $G_1$, $G_2$, $G_3$, and $G_4$. The other output for the fourth stage of binary counter 12, $\overline{A}$, is connected to "AND" gates $G_5$, $G_6$, $G_7$, and $G_8$. When the count of binary counter 12 is 8 or greater, then "AND" gates $G_1$, $G_2$, $G_3$, and $G_4$ may pass an output pulse. At that time, "AND" gates $G_5$, $G_6$, $G_7$, and $G_8$ cannot have an output pulse. When the count of binary counter 12 is below 8, "AND" gates $G_5$, $G_6$, $G_7$, and $G_8$ may pass an output pulse but "AND" gates $G_1$, $G_2$, $G_3$, and $G_4$ cannot. When the count of the binary counter 12 is less than 8, pulses may be applied through "AND" gates $G_5$, $G_6$, $G_7$, and $G_8$ to the four inputs of a first combining amplifier 16.

As illustrated in FIG. 4, first combining amplifier 16 consists of an operational amplifier 26 and a plurality of resistors $R_5$, $R_6$, $R_7$, $R_8$, and $R_A$. Connected between "AND" gate $G_5$ and operational amplifier 26 is resistor $R_5$. Connected between "AND" gate $G_6$ and operational amplifier 26 is resistor $R_6$. Connected between "AND" gate $G_7$ and operational amplifier 26 is resistor $R_7$. Connected between "AND" gate $G_8$ and operational amplifier 26 is resistor $R_8$. Resistor $R_A$ is connected in parallel with operational amplifier 26.

The output of combining amplifier 16 is directed through a second combining amplifier 17 to provide a series of positive weighted amplitude pulses.

As also illustrated in FIG. 4, second combining amplifier 17 consists of an operational amplifier 27 and a plurality of resistances $R_1$, $R_2$, $R_3$, $R_4$, $R_{16}$, and $R_B$. Connected between "AND" gates $G^1$ and operational amplifier 27 is resistor $R_1$. Connected between "AND" gate $G_2$ and operational amplifier 27 is resistor $R_2$. Connected between "AND" gate $G_3$ and operational amplifier 27 is resistor $R_3$. Connected between "AND" gate $G_4$ and operational amplifier 27 is resistor $R_4$. Connected between the output of combining amplifier 16 and operational amplifier 27 is resistor $R_{16}$. Resistor $R_B$ is connected in parallel with operational amplifier 27.

When the count of the binary counter 12 is 8 through 15, pulses may be applied through "AND" gates $G_1$, $G_2$, $G_3$, and $G_4$ to four of the inputs of combining amplifier 17. These pulses are combined in weighted amplitude manner and provide a series of negative weighted amplitude pulses at the output of combining amplifier 17. The difference in sign, positive or negative, is caused by the use of an operational amplifier to reverse the polarity of its input signal. The positive signals of combining amplifier 16 also go through combining amplifier 17, therefore, having the polarity reversed twice and retaining the positive sign. The signals entering combining amplifier 17 only have the polarity reversed once and the sign becomes negative.

Figure 5:
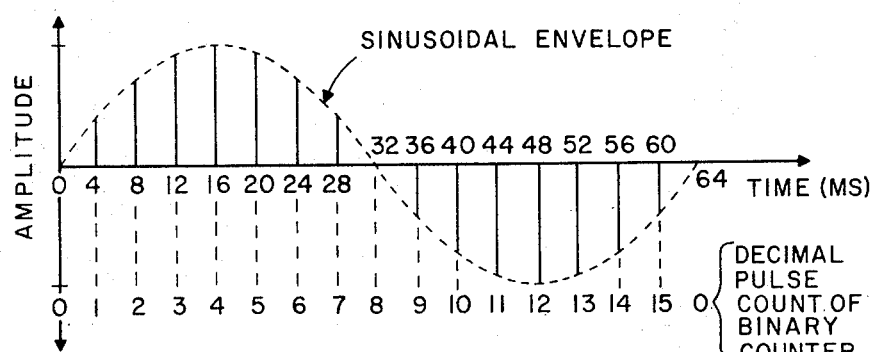
FIG. 5 is the time waveform at the output of the combining amplifier 17 showing the development of the sinusoidally modulated pulse train.

FIG. 5 illustrates the specific case of producing a pulse time waveform with a sinusoidal envelope. Using 16 time periods to produce one sinusoidal cycle and since there are $2\pi$ radians in each cycle, a weighted pulse is produced every $2\pi/16$ or $\pi/8$ radians. To operate the weighting resistors in a sinusoidal manner with a weighted pulse every $\pi/8$ radians, the resistors in FIG. 4 must have the following definite mathematical relationships:

$$\frac{R_A}{R_5}=\frac{R_B}{R_1}=\sin\frac{\pi}{8}=.38268$$

$$\frac{R_A}{R_6}=\frac{R_B}{R_2}=\sin\frac{\pi}{4}=.70711$$

$$\frac{R_A}{R_7}=\frac{R_B}{R_3}=\sin\frac{3\pi}{8}=.92388$$

$$\frac{R_A}{R_8}=\frac{R_B}{R_4}=\sin\frac{\pi}{2}=1.00000$$

$$\frac{R_B}{R_{16}}=1$$

Referring to FIG. 5, the time sequence of the output pulses of combining amplifier 17 is illustrated in comparison to the count of binary counter 12. The pulses prior to the count of 8 are positive and sinusoidally weighted. The pulses subsequent to the count of 8 are negative and also sinusoidally weighted. FIG. 5 illustrates a pulse occurring every 4 milliseconds. This specific time is just for illustrative purposes, the actual time between pulses being dependent on the frequency of the pulses. For a pulse every 4 milliseconds, a total time of 64 milliseconds is necessary for the 16 time periods counted by four-stage binary counter 12. The dashed line in FIG. 5, of course, does not appear in the actual output waveform but is shown to illustrate the appropriate envelope for sinusoidally amplitude-weighted pulse train. The pattern of the modulation waveform can be varied by adjustment of the weighting networks of the two combining amplifiers and various patterns of amplitude weighting can be obtained.

As illustrated by FIG. 6, the frequency spectrum at the output of combining amplifier 17 has a spectral envelope which is of a $\sin x/x$ form with the first null occurring at a frequency which is the reciprocal of the output pulse width. FIG. 6 only shows the spectral envelope. Arbitrary frequency lines are drawn on FIG. 6 purely for illustrative purposes, the actual frequency lines being identical to those in FIG. 1 with double sidebands around suppressed carriers occurring at multiples (0, 1, 2, 3 . . . etc.) of the pulse repetition frequency. If, for example, the pulse width is 50 microseconds, the first null frequency occurs at 20 kilohertz. FIG. 6 illustrates this specific case, showing the spectrum having zero value at plus and minus 20 kilohertz. This illustrated spectrum is essentially flat out to a frequency of 4 kilohertz, so by passing the combining amplifier 17 output signal through a filter 18 having a cutoff frequency at 4 kilohertz the desired frequency spectrum illustrated in FIG. 1 is obtained at the filter output. The frequency above which the spectrum begins to roll off being controlled by the pulse width, this width may be adjusted to produce a spectrum throughout any frequency range which may be desired. Any higher unwanted harmonics may be filtered out.

Using the example of a 50-microsecond pulse width and a 250-hertz periodic waveform input to monostable multivibrator 11, several other pertinent values may be determined. For example, the pulse repetition rate of the output pulses from monostable multivibrator 11 will be equal to 250 hertz. The time of the pulses is equal to the reciprocal of the frequency of the pulse and, therefore, a pulse would occur every 4 milliseconds. Since the time waveform of FIG. 4 involves 16 time periods, the total time of one cycle of the amplitude-weighted output of combining amplifier 17 is 16 times 4 milliseconds or 64 milliseconds. The frequency of the amplitude-weighted signal of FIG. 4 is therefore the reciprocal of 64 milliseconds or 15.625 hertz.

Using the above values, the desired output spectrum of FIG. 1 has groups of two sidebands 15.625 hertz from a suppressed carrier at frequencies which are a multiple of 250 hertz. The sidebands which are equidistant from the suppresed carriers are therefore spaced 2 times 15.625 hertz of 31.25 hertz apart.

If the frequency of the input periodic waveform, or the number of time periods used to form the periodic waveform are changed, all of the values discussed above would change accordingly. Therefore, by adjusting these values, the spectrum may be designed with sideband separation at a distance determined by the circuit designer and placement of the groups of suppressed carriers at frequencies determined by the designer.

Using this circuit concept, many other spectrums can be obtained. Many factors can be varied including the pulse repetition frequency, the pulse width, the number of time periods used to form the modulated waveform, and the form of the modulation waveform. The form of the modulation waveform, of course, is varied by adjustment of the weighted networks of the two combining amplifiers 16 and 17. Additional individual spectrum lines may be added to the output spectrum by additional inputs to either or both of the combining amplifiers 16 and 17. The output spectrum can also be modified by variations in the characteristics of the output filter 18.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

We claim:
1. A circuit for producing a predetermined pulse time waveform comprising:
   (a) pulse train producing means;
   (b) counting means connected to the output of said pulse train producing means for producing a plurality of digital outputs indicating which digital numbers are being counted by said counting means;
   (c) a plurality of logic device means, each of said plurality of logic device means connected to predetermined outputs of said counting means and to the output of said pulse train producing means, each of said logic device means passing an output pulse in response to a predetermined count of said counting means; and
   (d) amplitude weighting and combining means connected to the outputs of said plurality of logic device means for amplitude weighting the pulses from the outputs of said plurality of logic device means and combining the amplitude weighted pulses into a continuous pulse train producing said predetermined pulse time waveform.

2. A circuit according to claim 1 wherein said counting means is a binary counter.

3. A circuit according to claim 1 wherein said amplitude weighting and combining means comprises a plurality of weighting resistors and at least one operational amplifier.

4. A circuit according to claim 3 wherein said plurality of weighting resistors is weighted in such a manner that the pulse time waveform which is produced has a sinusoidal envelope.

5. A circuit according to claim 3 in which said plurality of weighting resistors is weighted in such a manner that a pulse time waveform is produced which has an associated double-sideband, suppressed carrier frequency spectrum.

6. A circuit according to claim 1 in which said pulse train producing means comprises a periodic waveform producing means and multivibrator means converting the output of said periodic waveform producing means to a pulse train.

7. A circuit according to claim 6 in which the pulse train produced by said multivibrator means has a pulse repetition rate equal to the period of said periodic waveform.

8. A circuit according to claim 6 wherein said multivibrator means is a monostable multivibrator.

9. A circuit according to claim 1 further comprising filter means connected to the output of said amplitude weighting and combining means to limit the frequency range of the frequency spectrum of said predetermined pulse time waveform.

10. A circuit according to claim 1 in which said amplitude weighting and combining means comprises:
 (a) a plurality of "OR" gates each connected to predetermined outputs of said plurality of logic device means;
 (b) a plurality of "AND" gates each connected to the output of one of said plurality of "OR" gates and to one of said plurality of digital outputs of said counting means which indicates whether or not higher order digital numbers are being counted by said counting means; and
 (c) a combining and weighting amplifier means connected to the output of said "AND" gates for amplitude weighting and combining the "AND" gate outputs into said predetermined pulse time waveform.

11. A circuit according to claim 9 wherein said combining and weighting amplifier means comprises a plurality of resistors and at least one operational amplifier.

12. A circuit for producing a predetermined pulse time waveform comprising:
 (a) periodic waveform producing means;
 (b) a monostable multivibrator connected to the output of said periodic waveform producing means, said monostable multivibrator producing a pulse train with pulses of a width predetermined by values within said monostable multivibrator;
 (c) a four-stage binary counter connected to the output of said monostable multivibrator, said four-stage binary counter having true and complement outputs of all four stages;
 (d) seven 4-input "AND" gates each having as one input the output of said monostable multivibrator and each having a group of three inputs from said four-stage binary counter, each group of said three inputs representing in binary form a digital number from 1 to 7, whereby when any one of said seven 4-input "AND" gates has a signal on all said three inputs a pulse is passed to the output thereof thereby indicating that a predetermined digital number is being counted by said four-stage binary counter;
 (e) three "OR" gates, the first of three "OR" gates having as inputs the outputs of the two of the seven 4-input "AND" gates having a group of said three inputs which represent in binary form the digital numbers 1 and 7, the second of three "OR" gates having as inputs the outputs of the two of the seven 4-input "AND" gates having a group of said three inputs which represent in binary form the digital numbers 2 and 6, and the third of three "OR" gates having as inputs the outputs of the two of the seven 4-input "AND" gates having a group of said three inputs which represent in binary form the digital numbers 3 and 5;
 (f) eight 2-input "AND" gates, gates 1 through 4 of said eight 2-input "AND" gates having an input from said four-stage binary counter indicating, when a signal is present, that a number 8 or greater is being counted and gates 5 through 8 of said eight 2-input "AND" gates having an input from said four-stage binary counter indicating, when a signal is present, that a number less than 8 is being counted, gates 1 and 5 of said eight 2-input "AND" gates being connected to the output of the first of the three "OR" gates, gates 2 and 6 of said eight 2-input "AND" gates being connected to the output of the second of the three "OR" gates, gates 3 and 7 of said eight 2-input "AND" gates being connected to the output of the third of the three "OR" gates, the 4-input "AND" gate which represents in binary form the digital number 4 being connected to gates 4 and 8 of said eight 2-input "AND" gates; and
 (g) a combining amplifier network consisting of two operational amplifiers and a plurality of weighting resistors, the outputs of gates 5 through 8 of said eight 2-input "AND" gates each being connected through one of said plurality of weighting resistors to the first of said two operational amplifiers and the outputs of gates 1 through 4 of said eight 2-input "AND" gates along with the output of said first of said two operational amplifiers being connected through the other of said two operational amplifiers.

13. A circuit according to claim 12 in which the plurality of weighting resistors is weighted in a manner such that a pulse time waveform is produced which has an associated double-sideband, suppressed carrier frequency spectrum.

14. A circuit according to claim 12 further comprising a filter connected to the output of said other of two operational amplifiers to limit the frequency range of the frequency spectrum of said predetermined pulse time waveform.

15. A method of producing a predetermined frequency spectrum by forming an associated predetermined pulse time waveform from a pulse train, comprising:
 (a) logically separating the pulses of said pulse train;
 (b) amplitude weighting each separated pulse; and
 (c) recombining each amplitude-weighted pulse into an amplitude-weighted pulse train thereby forming said predetermined pulse time waveform with which said predetermined spectrum is associated.

16. A method according to claim 15 wherein the step of logically separating the pulses of said pulse train comprises:
 (a) counting each pulse of said pulse train; and
 (b) passing each pulse through one of a plurality of logic device means in response to a predetermined count of the pulses of the pulse train.

17. A method according to claim 15 in which the step of amplitude weighting each separate pulse includes applying the separated pulses individually across resistors of predetermined values.

18. A method according to claim 15 in which the step of recombining each amplitude-weighted pulse into an amplitude-weighted pulse train thereby producing said predetermined pulse time waveform is accomplished by applying the weighted separated pulses into at least one operational amplifier.

19. A method according to claim 15 further comprising a step of filtering the amplitude-weighted pulse train to limit the frequency range of the frequency spectrum of said predetermined pulse time waveform.

20. A method according to claim 17 in which said resistors are weighted in a manner such that a pulse time waveform is produced which has an associated double sideband suppressed carrier frequency spectrum.

References Cited

UNITED STATES PATENTS

| | | | |
|---|---|---|---|
| 3,100,874 | 8/1963 | Soland | 328—165 |
| 3,201,706 | 8/1965 | Piety | 328—167 |
| 3,314,015 | 4/1967 | Simone | 328—14 |
| 3,331,035 | 7/1967 | Strickholm | 328—14 |

DONALD D. FORRER, Primary Examiner

H. A. DIXON, Assistant Examiner

U.S. Cl. X.R.

328—109, 165; 333—70